United States Patent [19]
Presentey

[11] 3,840,196
[45] Oct. 8, 1974

[54] DEVICE FOR ANCHORING LEADERS OF FLEXIBLE STRIPS IN THE CORES OF REELS OR THE LIKE

[76] Inventor: Shelley M. Presentey, 1268 Henry Farm Dr., Ottawa, K2C2E2, Canada

[22] Filed: Apr. 9, 1973

[21] Appl. No.: 349,548

[52] U.S. Cl. .............................................. 242/74
[51] Int. Cl. .......................................... B65h 75/28
[58] Field of Search................. 242/74, 78.3, 125.1; 197/175

[56] References Cited
UNITED STATES PATENTS

| | | | |
|---|---|---|---|
| 3,062,468 | 11/1962 | Brown.................................. | 242/74 |
| 3,497,050 | 2/1970 | Landgraf............................. | 242/74 X |
| 3,648,944 | 3/1972 | Fujiwara............................. | 242/74 |

FOREIGN PATENTS OR APPLICATIONS

| 211,850 | 2/1925 | Great Britain....................... | 242/74 |
|---|---|---|---|

*Primary Examiner*—John W. Huckert
*Assistant Examiner*—Edward J. McCarthy
*Attorney, Agent, or Firm*—Michael S. Striker

[57] ABSTRACT

A reel for convoluted magnetic tape or the like has a core provided with an eccentric axially parallel hole and a slot which extends from the hole to the periphery of the core. The hole receives a split anchoring ring consisting of springy material and having a tendency to expand so as to move its external surface into frictional engagement with the surface surrounding the hole. The ring has an axially parallel mouth flanked by two prongs which can be moved toward each other to contact the ring so that the latter can be rotated in order to move its mouth into register with the slot. Upon introduction of the leader of a tape into the interior of the ring by way of the slot and the mouth, the operator can anchor the leader in the core with a force of desired magnitude by rotating the ring through a fraction of a single revolution or through one or more revolutions to thus convolute the leader around the ring. The convoluted portion of the leader is clamped between the core and the external surface of the ring as soon as the latter is allowed to expand. The prongs can pinch the leader while the ring rotates in the hole.

10 Claims, 1 Drawing Figure

PATENTED OCT 8 1974
3,840,196
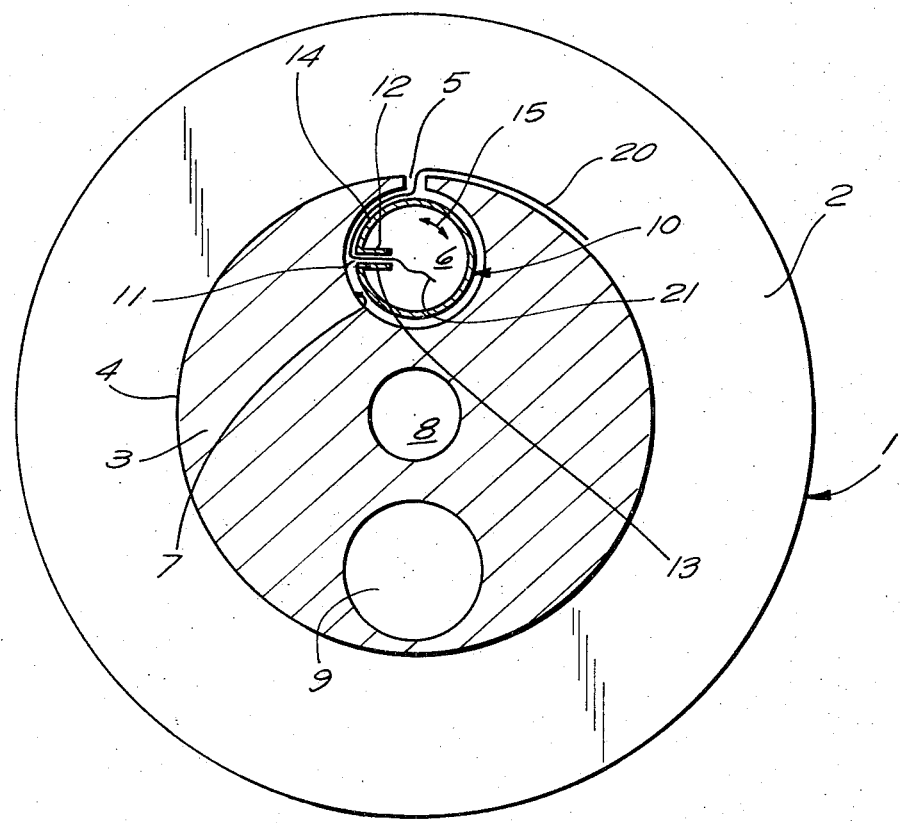

DEVICE FOR ANCHORING LEADERS OF FLEXIBLE STRIPS IN THE CORES OF REELS OR THE LIKE

BACKGROUND OF THE INVENTION

The present invention relates to devices for storing, collecting or dispensing strips of flexible material, such as magnetic tape, punched tape, photographic film, typewriter ribbons, paper webs or the like. More particularly, the invention relates to improvements in means for securing the leader of a flexible strip to the core of a reel, bobbin, spool or an analogous device which serves for storage of flexible strip stock in convoluted form.

It is already known to secure the leader of a strip of magnetic tape or the like to the core of a reel by means of adhesive-coated uniting bands or by providing the leader with a tab or with a hole which receives a hook, a tooth or analogous projection of the core. It is further known to insert the leader into a slot of the core and to thereupon convolute the leader around the core. A drawback of such proposals is that the operator cannot accurately select the magnitude of the force with which the leader is attached to the core. For example, in some instances, the user might wish to attach the leader in such a way that, when the strip is subjected to a predetermined tensional stress, the leader is automatically detached from the core. In certain other situations, the leader should be attached to the core with a force which is greater than the maximum permissible tensional stressing of the strip, i.e., the leader should not be allowed to become separated from the core even at the risk of destroying the strip. The presently known anchoring means for separably or permanently securing the leaders of strips to the cores of reels or the like are not sufficiently versatile to allow for such selection of the anchoring forces.

SUMMARY OF THE INVENTION

An object of the invention is to provide a novel and improved reel, spool, bobbin or an analogous device for storing, collecting or dispensing convoluted strips of magnetic tape, photographic film, paper webs, typewriter ribbons or the like in such a way that the leader of the convoluted strip can be rapidly attached to or detached from the core of the device and that the leader can be anchored in the core with a force of selected magnitude.

Another object of the invention is to provide novel and improved anchoring means for separably securing the leader of a flexible strip to the core of a reel, spool or the like.

A further object of the invention is to provide a novel core which can be utilized with the improved anchoring means to insure satisfactory anchoring of the leader of a flexible strip before the strip is convoluted around the core.

An additional object of the invention is to provide an anchoring member which can separably secure the leader of a flexible strip of the core to a reel without any damage to the leader and with a force which can be selected at will and which can be changed, if desired, after the strip is already convoluted on the core.

The invention is embodied in a device for storing, collecting or dispensing convoluted strips of magnetic tape, photographic film or the like. The device comprises a rotary core having a preferably cylindrical periphery provided with a generally axially extending slot, a chamber which is inwardly adjacent to the periphery and communicates with the slot, and a concave internal surface bounding the chamber. In accordance with a feature of the invention, the device further comprises a springy annular anchoring member having an external surface adjacent to the internal surface of the core and exhibiting a tendency to expand radially to thereby urge the external surface into frictional engagement with the internal surface. The anchoring member is contractible, either by hand or by resorting to a suitable tool, to establish between the internal and external surfaces a clearance for reception of the leader of a strip which is inserted into the chamber by way of the slot whereby the leader is automatically held against withdrawal from the chamber in response to expansion of the anchoring member.

In accordance with a more specific feature of the invention, the anchoring member is rotatable in the chamber and has an axially parallel mouth which can be moved into register with the slot of the core. If the leader of a strip is introduced into the anchoring member by way of the slot and mouth, and if the anchoring member is thereupon rotated in the chamber, the leader forms one or more convolutions which surround the external surface and are clamped between the two surfaces as soon as the anchoring member is allowed to expand. The length of that portion of the leader which is convoluted around the anchoring member determines the magnitude of the force with which the leader is held against extraction from the chamber.

The novel features which are considered as characteristic of the invention are set forth in particular in the appended claims. The improved device itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is a transverse sectional view of a reel or spool which is intended for storage of magnetic tape or similar strip-shaped material and embodies one form of the invention.

DESCRIPTION OF THE PREFERRED EMBODIMENTS

The single FIGURE illustrates a rotary reel or spool 1 having two flanges 2 (only one shown) disposed at the opposite axial ends of a cylindrical mandrel or core 3 and extending beyond the periphery 4 of the core. The periphery 4 is provided with an axially parallel slot 5 which communicates with an elongated chamber 6 here shown as an eccentric hole which is parallel to the axis of the reel 1. The cylindrical internal surface which surrounds the chamber 6 is shown at 7. The core 3 may consist of metallic or synthetic plastic material.

In accordance with a feature of the invention, the chamber 6 receives a springy annular anchoring member 10 which is shown in the form of a split ring or sleeve and has a slit or mouth 11 flanked by two projections or prongs 12, 13 extending radially inwardly toward the center of the anchoring member. The anchoring member 10 is inserted into the chamber 6 in prestressed condition so that it tends to expand and thereby maintains its cylindrical external surface 14 in frictional engagement with the internal surface 7. The chamber 6 is assumed to extend through one or both flanges 2 so that at least one end of the anchoring member 10 is accessible from without the reel 1. This enables an operator to grip the prongs 12, 13 and to move them toward each other to thus contract the anchoring member (as shown in the drawing) with the result that the external surface 14 moves away from and defines with the internal surface 7 a clearance which can receive one or more convolutions of a flexible strip 20. Moreover, when the prongs 12, 13 are moved toward each other to reduce the diameter of the external surface 14, the operator can rotate the anchoring member 10 in the chamber 6 so as to move the mouth 11 into register with the slot 5. The leader 21 of the strip 20 is then introduced into the chamber 6 (i.e., into the anchoring member 10) by way of the slot 5 and mouth 11 before the anchoring member is rotated in the core 3 so that the leader 21 is convoluted around the external surface 14. The pressure upon the prongs 12, 13 is thereupon terminated so that the anchoring member 10 is free to expand and to clamp the convoluted portion of the leader 21 between the surfaces 7 and 14.

The prongs 12, 13 preferably further serve as a means for pinching that portion of the leader 21 which extends through the mouth 11 so as to insure that the leader 21 cannot slip during rotation of the anchoring member 10 in the chamber 6. The extent to which the anchoring member 10 is rotated determines the magnitude of the force with which the leader 21 is clamped between the surfaces 7 and 14. Thus, by the simple expedient of rotating the anchoring member 10 through a fraction of one revolution or through one or more revolutions, the operator can select the force which must be applied in order to extract the leader 21 from the chamber 6. Such force can be readily selected with a view to prevent an extraction of the leader 21, i.e., to insure that the strip 20 will tear before the leader can be withdrawn from the core 3 by way of the slot 5.

The prongs 12, 13 can be engaged by hand or by means of a suitable tool, such as pliers, tweezers or the like. The directions in which the anchoring member 10 can be rotated to move the mouth 11 into or out of register with the slot 5 are indicated by a double-headed arrow 15.

The anchoring member 10 may be made of any suitable springy material, e.g., a metal or a synthetic plastic substance, which exhibits a desired degree of resiliency in order to insure that the leader 21 between the surfaces 7 and 14 can be held with a required force. If the reel 1 serves for storage of magnetic tape, the anchoring member 10 preferably consists of nonmagnetic material. The surface 7 and/or 14 may be roughened by milling or the like to further increase the magnitude of the retaining force. Also, the prongs 12, 13 may be provided with extensions which project beyond one or both flanges 2 so that they can be readily grasped by fingers of two hands in order to allow for convenient contraction of the anchoring member. The flange or flanges 2 may be made integral with the core 3.

The core 3 is further provided with an axial bore 8 for reception of a shaft (not shown) which may serve to rotate the core while the latter collects or pays out the strip 20. Furthermore, the core 3 is formed with a second axially parallel hole or chamber 9 which is located diametrically opposite the chamber 6 and is provided for the purpose of reducing the overall weight of the reel 1 as well as to insure proper static and dynamic balancing of the reel. The core may be provided with more than two holes or chambers, the essential requirement being to maintain, if necessary, the static and dynamic balance of the reel system. It will be noted that the chamber 6 serves several purposes, namely, to reduce the weight of the reel, to maintain the static and dynamic balance of the reel, as well as to constitute a receptacle for the improved anchoring member 10. It is clear that the other chamber 9 can also communicate with a slot (corresponding to the slot 5) so that the anchoring member 10 (or another anchoring member) can be inserted into the chamber 6 or 9. As a rule, the axial length of the anchoring member 10 will equal or approximate the overall axial length of the reel 1.

It is further within the purview of the invention to provide the core 3 with a chamber which is bounded only in part by a concave surface. Thus, the configuration of that part of the chamber 6 which is remote from the slot 5 is of no consequence, as long as the chamber can receive the anchoring member 10 in such a way that the latter can expand and thereby moves at least a portion of its external surface 14 into requisite frictional engagement with the surface 7 or with a portion of the leader 21 which is received in the clearance between the surfaces 7 and 14. It will be readily appreciated that the bias of the anchoring member 10 increases proportionally with the number of convolutions which are formed by the leader 21 in the clearance between the surfaces 7 and 14. Thus, the bias of the anchoring member 10 increases proportionally with increasing reduction of the diameter of the surface 14. The arrangement may be such that the leader 21 can be readily extracted from the chamber 6 if it forms only a fraction of one convolution between the surfaces 7, 14 and that the leader is anchored with a substantial force (so that it cannot be extracted at all unless the prongs 12, 13 are moved toward each other) if it forms one or more convolutions around the surface 14.

The improved device is susceptible of many additional modifications. For example, the anchoring member may be assembled of two or more arcuate sections which are biased apart by one or more springs installed in the space which is surrounded by the anchoring sections. Also, the periphery 4 of the core 3 may be provided with one or more slots 5 whose length need not equal the axial length of the core and such slot or slots need not be exactly parallel to the axis of the reel.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A device for storing, collecting and dispensing convoluted strips of magnetic tape, photographic film or the like, comprising a rotary core having a periphery provided with a generally axially extending slot, a chamber inwardly adjacent to said periphery and communicating with said slot, and an internal surface bounding said chamber, said surface being concave at least in the region of said slot; and a springy annular anchoring member having an external surface adjacent to said internal surface and a substantially axially extending slit, said core and said member being turnable relative to each other to move said slit into and out of register with said slot and said member having a tendency to expand radially to thereby urge said external surface into frictional engagement with said internal surface, said member being contractible to establish between said surfaces a clearance for reception of a portion of a strip whose leader is inserted into said member by way of said slot and said slit while the latter registers with said slot whereby said portion of the strip is automatically held against withdrawal from said core in response to turning of said member and core relative to each other to move said slit out of register with said slot and subsequent expansion of said member in said chamber, said turning of said core and said member relative to each other while the leader extends into said member through said slit causing said portion of the strip to enter between said surfaces.

2. A device as defined in claim 1, wherein at least one of said surfaces is roughened.

3. A device for storing, collecting and dispensing convoluted strips of magnetic tape, photographic film or the like, comprising a rotary core having a periphery provided with a generally axially extending slot, a chamber inwardly adjacent to said periphery and communicating with said slot, and an internal surface bounding said chamber, said surface being concave at least in the region of said slot; and a springy split ring having an external surface adjacent to said internal surface, said split ring having a tendency to expand radially to thereby urge said external surface into frictional engagement with said internal surface and being contractible to establish said surfaces a clearance for reception of the leader of a strip which is inserted into said chamber by way of said slot whereby the leader is automatically held against withdrawal from said chamber in response to expansion of said split ring, said split ring having an axially parallel mouth and a pair of projections which flank said mouth and are spaced apart at least when said external surface engages said internal surface, said projections being movable toward each other to thereby move said external surface away from said internal surface and to thus establish said clearance.

4. A device as defined in claim 1, wherein said chamber is parallel to the axis of said core and said internal surface is a cylindrical surface.

5. A device as defined in claim 3, wherein said anchoring member is turnable in said chamber to move said mouth into and out of register with said slot whereby a strip whose leader is introduced into the interior of said anchoring member by way of said mouth can be convoluted around said member in response to rotation of said member in said chamber.

6. A device as defined in claim 5, wherein said projections are movable sufficiently close to each other to pinch the leader of a strip which is inserted into said anchoring member by way of said slot and said mouth.

7. A device as defined in claim 5, wherein said projections extend substantially radially inwardly toward the center of said anchoring member.

8. A device as defined in claim 1, wherein said anchoring member consists of nonmagnetic material.

9. A device as defined in claim 1, wherein said chamber is an eccentric axially parallel cylindrical hole.

10. A device as defined in claim 1, wherein said chamber is an axially parallel hole in said core and is open at one or both ends thereof, the axial length of said anchoring member being equal to or approximating the length of said hole.

* * * * *